United States Patent

Sanada et al.

[11] Patent Number: 5,530,061
[45] Date of Patent: Jun. 25, 1996

[54] PROCESS FOR PRODUCING IMPACT-RESISTANT POLYACETAL RESIN COMPOSITION

[75] Inventors: Daisuke Sanada; Masao Hasegawa, both of Hiratsuka; Satoshi Nagai, Yokkaichi; Hiroshi Mimura, Hiratsuka, all of Japan

[73] Assignee: Mitsubishi Gas Chemical Company, Inc., Tokyo, Japan

[21] Appl. No.: 338,867

[22] Filed: Nov. 14, 1994

[30] Foreign Application Priority Data

Nov. 18, 1993 [JP] Japan ................... 5-289465

[51] Int. Cl.⁶ .............. C08G 63/48; C08G 18/00; C08L 61/02; C08J 5/00
[52] U.S. Cl. ............... 525/52; 264/331.19; 525/399; 525/452; 525/453; 525/456; 528/44; 528/59; 528/60; 528/61; 528/63; 528/64; 528/67; 528/85
[58] Field of Search ............. 528/44, 59, 60, 528/61, 63, 64, 67, 85; 525/52, 399, 452, 453, 456; 264/331.19

[56] References Cited

U.S. PATENT DOCUMENTS 4,929,712  5/1990  Sugiyama et al. ............. 528/230
4,946,906  8/1990  Yano et al. .................... 525/399
5,183,860  2/1993  Kashihara ..................... 525/398
5,292,824  3/1994  Nagai et al. ................... 525/399
5,326,846  7/1994  Nagai et al. ................... 528/44

*Primary Examiner*—Paul R. Michl
*Assistant Examiner*—Patrick Niland
*Attorney, Agent, or Firm*—Wenderoth, Lind & Ponack

[57] ABSTRACT

A process for producing an impact-resistant polyacetal resin composition, which comprises a first step of mixing with shear a polyacetal resin (A), a thermoplastic polyurethane (B) and a polyhydric alcohol (C) having at least three hydroxyl groups in the molecule at a temperature of 180° to 250° C. and at a temperature at which said polyacetal resin (A) and said thermoplastic polyurethane (B) melt; and a second step of mixing with shear the resulting mixture obtained in the first step, in the presence of at least one compound (D) selected from the group consisting of a polyisocyanate ($d_1$) and a compound ($d_2$) which generates a polyisocyanate under heat, at a temperature of 180° to 250° C. and at a temperature at which said polyacetal resin (A) and said thermoplastic polyurethane (B) melt. The polyacetal resin composition provided by the above process is useful as a material for such parts as clips, springs, gears, bearings, cams, levers and the like in electric and electronic machines, office machines, automobiles, industrial machines, toys and/or sports goods, etc.

8 Claims, 1 Drawing Sheet

PROCESS FOR PRODUCING IMPACT-RESISTANT POLYACETAL RESIN COMPOSITION

BACKGROUND OF THE INVENTION

1. Field of the Invention

This invention relates to a process for producing an impact-resistant polyacetal resin composition which is conveniently used as a material for such parts as clips, springs, gears, bearings, cams, levers and the like in electrical and electronic machines, office machines, automobiles, industrial machines, toys and/or sports goods, etc.

The invention also relates to a process for producing an impact-resistant polyacetal resin composition which can give parts having excellent adhesion of weld portions when the parts molded by injection molding have the weld portions.

The invention is further directed to a process for producing an impact-resistant polyacetal resin composition which can give the above-described parts having excellent outer appearance by means of melt molding.

The invention is further directed to a process for producing an impact-resistant polyacetal resin composition of which change in melt viscosity by elapse of time is small.

2. Prior Arts

Polyacetal has found wide usage as an engineering plastic excelling in mechanical properties, electrical properties and chemical properties such as chemical resistance. Its usages are limited, however, because of its inferior impact resistance compared to that of other engineering plastics. As a method to improve impact resistance, i.e., impact strength, of polyacetal, a means to blend a thermoplastic polyurethane elastomer with polyacetal has been proposed and has been already put to practical use.

For example, U.K. Patent 1,017,244 discloses a thermoplastically deformable composition, which comprises a polyurethane of high molecular weight at least 8,000 and a polyoxymethylene of molecular weight at least 4,000, the ratio of the polyurethane to the polyoxymethylene being from 5:95% by weight to 95:5% by weight.

However, a molded article obtained by melt molding a composition comprising a polyacetal and a thermoplastic polyurethane has substantially poor outer appearance. The reason for this is that each of the polymers forms an independent layer in the inside of the molded article and on the surface thereof because of poor compatibility between the two polymers, and these layers are separated from each other on the surface of the molded article.

Furthermore, when a molded article molded by injection molding has a weld portion, the adhesion of the weld portion is not always sufficient.

Under the situation described above, use of a composition which comprises a polyacetal and a thermoplastic polyurethane as a material for producing parts having complex shapes formed by weld portions and parts whose outer appearance is of a great importance has been avoided in many cases.

European Laid-open Patent No. 0565304A1 proposes a process for producing an impact-resistant polyacetal resin composition, which comprises mixing with shear a polyacetal resin (A), a thermoplastic polyurethane (B), a polyhydric alcohol (C) having at least three hydroxyl groups in the molecule, and at least one compound (D) selected from the group consisting of a polyisocyanate ($d_1$) and a compound ($d_2$) which generates a polyisocyanate under heat, while at least two components (A) and (B) are melted. The impact-resistant polyacetal resin composition produced by this process gives injection-molded shaped articles showing highly well-balanced various physical properties such as tensile strength and elongation at break at weld portions, impact resistance and outer appearance than the conventional impact-resistant polyacetal resin composition.

The present inventors have newly found that (1) articles with weld portions, molded from the impact-resistant polyacetal resin composition produced by the process proposed above are required to be further improved in elongation at break at weld portions and (2) the impact-resistant polyacetal resin composition may be unsuitable as a molding material because its melt viscosity changes by elapse of time.

SUMMARY OF THE INVENTION

An object of the present invention is to provide a novel process for producing a polyacetal resin composition.

A more specific object of the present invention is to provide a novel process for producing a polyacetal resin composition whose basic components are a polyacetal resin and a thermoplastic polyurethane, which gives injection-molded shaped articles showing highly well-balanced various physical properties such as tensile strength, elongation at break at weld portions, impact resistance and outer appearance, especially having sufficient elongation at break at weld portions.

Another specific object of the present invention is to provide a novel process for producing stably a polyacetal resin composition of which change in melt viscosity by elapse of time is small.

According to the present invention, there is provided a process for producing an impact-resistant polyacetal resin composition, which comprises:

(1) a first step of mixing with shear a polyacetal resin (A), a thermoplastic polyurethane (B) and a polyhydric alcohol (C) having at least three hydroxyl groups in the molecule at a temperature of 180° to 250° C. and at a temperature at which the polyacetal resin (A) and the thermoplastic polyurethane (B) melt; and (2) a second step of mixing with shear the resulting mixture obtained in the first step in the presence of at least one compound (D) selected from the group consisting of a polyisocyanate ($d_1$) and a compound ($d_2$) which generates a polyisocyanate under heat, at a temperature of 180° to 250° C. and at a temperature at which the polyacetal resin (A) and the thermoplastic polyurethane (B) melt.

The above-described object of the present invention can be attained by this process.

Injection-molded articles from the polyacetal resin composition, provided by the present invention, exhibit excellent tensile strength and outer appearance, especially, superior elongation at break at weld portions, in comparison with those of injection-molded articles from polyacetal resin compositions produced by the process proposed by European Laid-open Patent No. 0565304A1. Therefore, the novel polyacetal resin composition provided by the process of this invention exhibits an excellent balance among the above-described physical properties.

Further, an impact-resistant polyacetal resin composition of which change in melt viscosity by elapse of time is small can be produced stably by the process for producing an impact-resistant polyacetal resin composition, provided by the present invention.

The present invention is described in further details hereafter, whereby the objects and advantages of the invention will become all the more clear.

DETAILED DESCRIPTION OF THE INVENTION

Figure 1:
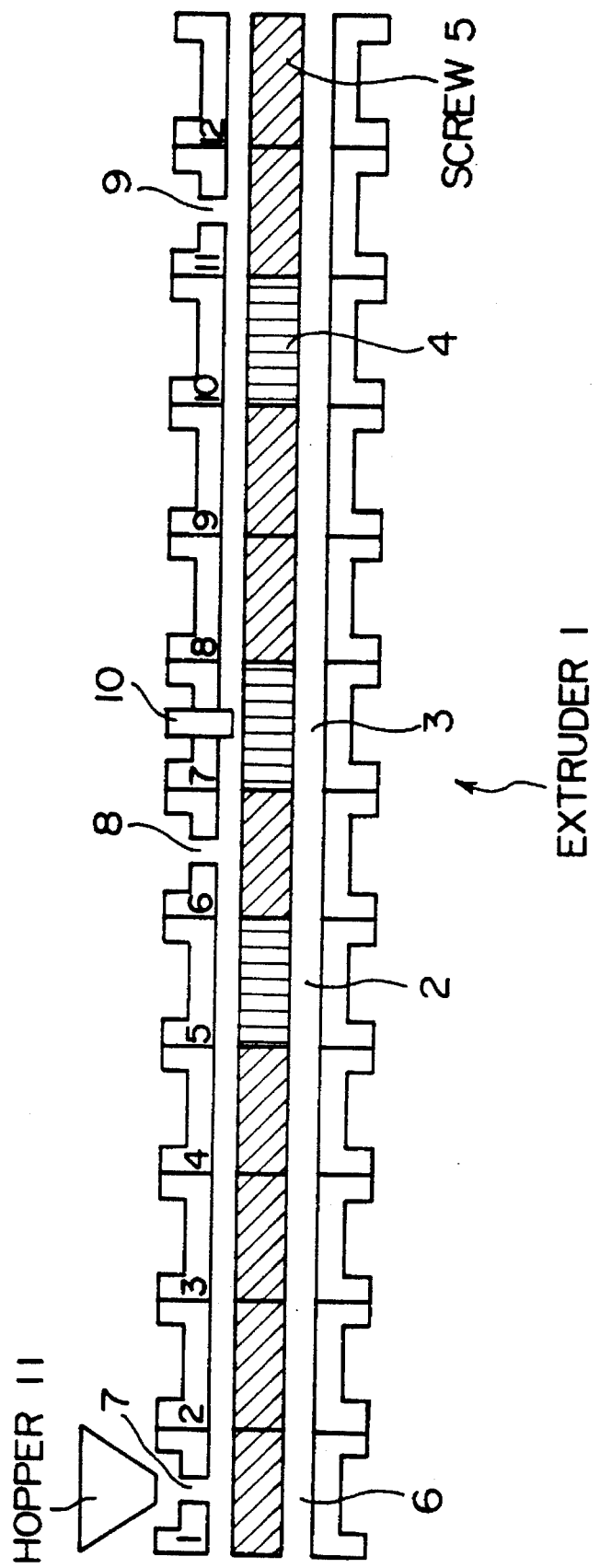
FIG. 1 is a schematic sectional view of an extruder used in the production process of the present invention.

The polyacetal resin (A) used in the present invention contains oxymethylene units as the chief recurring unit, preferably in an amount of at least 50 mol %. The polyacetal resin (A) includes an oxymethylene homopolymer composed substantially of an oxymethylene unit, which can be prepared from formaldehyde or trimer thereof (trioxane); an oxymethylene copolymer containing up to 20% by weight of $C_2$–$C_8$ hydroxyalkylene units, whose hydrogen may be substituted by halogen, which can be prepared from formaldehyde or trimer thereof (trioxane) and $C_2$–$C_8$ cyclic ether such as ethylene oxide, epichlorohydrin, 1,3-dioxolane, 1,3,5-trioxepane, formal of glycol and formal of diglycol; an oxymethylene block copolymer or graft copolymer which contains the above oxymethylene homopolymer or copolymer as the main structure, and further contains block chains or terminal structure other than oxymethylene unit; and a crosslinked oxymethylene polymer.

Some of commercially available resins can be used as the polyacetal resin (A), or, the resins used as the polyacetal resin (A) can be prepared by methods as known It is preferred that the polyacetal resin (A) has a melt index (MI) of at least 0.01, in particular from 0.1 to 100, as measured at 190° C. under a load of 2.16 kg according to ASTM-D 1238.

Commercial polyacetal resins are available in a form of powder, flake or pellet, any of which forms can be used in the present invention.

Commercial polyacetal resins are incorporated with stabilizers or antioxidants so that their decomposition under the actions of oxygen, heat, water and light, etc. is inhibited. Typical examples of such additives include melamine, melamine resin, cyanoguanidine, polyamide, hindered phenol and hindered amine. The additives as stabilizers or anti-oxidants which are blended in commercial polyacetal resins, effectively function to improve heat stability of the composition of the present invention and, in most cases, do not adversely affect or provide hindrances to the effect of the present invention. Accordingly, polyacetal resins blended with those additives are used with preference.

The thermoplastic polyurethane (B) used in the present invention can be obtained through a reaction of a diisocyanate with a diol having hydroxyl groups at its molecular terminals by a method known per se. The polyurethane (B) contains urethane linkages in the polymer main chain. In the occasion of reacting diisocyanate with diol, a chain-extending agent may be additionally used. In the above reaction, the molar ratio (NCO/OH) of the isocyanate group to the hydroxyl group ranges preferably 0.5 to 2, more preferably 0.9 to 1.5.

As the diisocyanates, $C_4$ to $C_{50}$, in particular $C_6$ to $C_{40}$, aromatic, alicyclic or aliphatic diisocyanates are preferred. More specifically, preferred diisocyanates include: diphenylmethane-4,4'-diisocyanate, tolylene diisocyanate, naphthylene diisocyanate, diphenyl diisocyanate, p,p'-benzidine diisocyanate, durene diisocyanate, 1,6-hexamethylene diisocyanate, lysine diisocyanate, 4,4'-methylene-bis-(cyclohexylisocyanate), m-xylylene diisocyanate and p-xylylene diisocyanate.

As a diisocyanate, diphenylmethane-4,4'-diisocyanate, tolylene diisocyanate, 1,6-hexamethylene diisocyanate, m-xylylene diisocyanate and isophorone diisocyanate are particularly preferred.

The diol component constituting the thermoplastic polyurethane (B) can be suitably selected from polyether diol, polyester diol, polyetherester diol and polycarbonate diol of number average molecular weight ranging preferably from 500 to 5,000, more preferably from 1,000 to 3,000.

Specific preferred examples of the polyether diol include polyethylene glycol, polypropylene glycol, polytetramethylene glycol and polyhexamethylene glycol.

The polyether diol can be obtained by ring-opening polymerization of $C_2$–$C_{12}$ cyclic ether such as ethylene oxide, propylene oxide and tetrahydrofuran.

The polyester diol has the main structure of polyester and hydroxyl groups at two terminals of the molecular chain. It can be prepared from dihydric alcohol and dicarboxylic acid by an esterification or ester-interchange reaction. It is also possible to produce a polyester diol by ring-opening polymerization of lactone. As the preferred dihydric alcohol, $C_2$–$C_{12}$ alkanediol such as ethylene glycol, propylene glycol, 1,4-butanediol, 1,3-butanediol, 1,5-pentanediol, 3-methyl-1,5-pentanediol, 1,6-hexanediol, neopentylglycol, 2-methylpropanediol, 2-methyl-1,8-octanediol, nonanediol and 1,10-decanediol can be used. And, as the dicarboxylic acid, $C_4$–$C_{12}$ aliphatic or $C_8$–$C_{12}$ aromatic dicarboxylic acid such as glutaric acid, adipic acid, pimelic acid, suberic acid, sebacic acid, terephthalic acid and isophthalic acid are preferably used. Also as the lactone, $C_4$–$C_{10}$ lactone such as caprolactone, propiolactone and varelolactone can be given as preferred examples.

The polyetherester diol has an ester group and an ether group in its main chain and hydroxyl groups at the two terminals. Such polyetherester diol can be obtained, for example, by reacting the above polyether diol with a dicarboxylic acid anhydride to convert the terminal group to a carboxyl group, and further reacting it with cyclic ether.

As the dicarboxylic acid anhydride, those having 4 to 15 carbons such as phthalic anhydride, maleic anhydride, succinic anhydride and tetrahydrophthalic anhydride are preferably used.

As the cyclic ether, those having 2 to 7 carbon atoms such as ethylene oxide, propylene oxide and tetrahydrofuran can be preferably used.

The polycarbonate diol has a carbonate group in its main chain and two hydroxyl groups at its molecular chain terminals. The polycarbonate diol can be obtained through a reaction of a dihydric alcohol or phenol with diphenyl carbonate or phosgene. As the dihydric alcohol, $C_2$–$C_{12}$ alkanediol such as ethylene glycol, propylene glycol, 1,4-butanediol, 1,3-butanediol, 1,5-pentanediol, 3-methyl-1,5-pentanediol, 1,6-hexanediol, neopentyl glycol, 2-methylpropanediol, 2-methyl-1,8-octanediol, nonanediol and 1,10-decanediol can be used as preferred examples.

As the chain-extending agent which may serve as a constituent of the thermoplastic polyurethane (B), aliphatic, alicyclic or aromatic diols or diamines having number average molecular weight of less than 500, preferably from 60 to 300, are used. Preferred examples of such diols include ethylene glycol, 1,3-propylene glycol, 1,2-propylene glycol, 1,4-butanediol, 1,5-pentanediol, 1,6-hexanediol, 1,4-cyclohexanediol, hydroquinonediethylolether, 1,4-bishydroxyethylbenzene, resorcinediethylolether and hydrogenated bisphenol A. As the diamine, ethylenediamine, hexamethylenediamine, xylylenediamine and 4,4'-diaminodiphenylmethane can be preferably used.

The melt flow rate of the thermoplastic polyurethane (B) measured at 190° C. under a load of 21.6 kg according to ASTM D 1238 is preferably at least 0.1, more preferably 1 to 100.

The polyhydric alcohol which is the component (C) contains at least three hydroxyl groups, preferably 3 to 50 hydroxyl groups, in the molecule. The polyhydric alcohol (C) preferably contains 3 to 100 carbon atoms, in particular, 3 to 50 carbon atoms. More specifically, as the polyhydric alcohols (C), glycerine, trimethylolethane, trimethylolpropane, hexanetriol, triethanolamine, diglycerine, pentaerythritol, tetraethanol ethylenediamine, methylglucosite, aromatic diaminetetraethanol adduct, sorbitol, dipentaerythritol, cyclodextrin and sugar can be preferably used. Further, a polymer having hydroxyl groups in its polymer chain such as phenoxy resin or polyvinyl alcohol can also be used as the polyhydric alcohol (C).

The polyisocyanate ($d_1$) preferably has 4 to 50 carbon atoms, particularly preferably has 8 to 30 carbon atoms. Specific examples of the polyisocyanate ($d_1$) include diphenylmethane-4,4'-diisocyanate, tolylenediisocyanate, naphthylenediisocyanate, diphenyldiisocyanate, 1,6-hexamethylenediisocyanate, isophoronediisocyanate, 4,4'-methylenebis(cyclohexylisocyanate), m-xylylenediisocyanate, p-xylylenediisocyanate, hydrogenated m-xylylenediisocyanate and hydrogenated p-xylylenediisocyanate.

The compound ($d_2$) which generates a polyisocyanate under heat includes a dimer of the above polyisocyanate ($d_1$), a trimer of the polyisocyanate ($d_1$), an adduct of the polyisocyanate ($d_1$) with a carbodiimide, a prepolymer of the polyisocyanate ($d_1$) and the polyhydric alcohol (C), and a blocked polyisocyanate obtained by blocking the polyisocyanate ($d_1$) with any one of blocking agents such as phenol, a primary alcohol and caprolactam.

In addition to the above starting materials (A), (B), (C) and (D), a small amount of an aliphatic diol, an aromatic diol or a diamine may be additionally incorporated. Examples of the aliphatic diol and aromatic diol include ethylene glycol, 1,3- or 1,2-propylene glycol, 1,4-butanediol, 1,5-pentanediol, 1,6-hexanediol, 1,4-cyclohexanediol, hydroquinone diethylol ether, 1,4-bishydroxyethylbenzene, resorcin diethylol ether and hydrogenated bisphenol A. Examples of the diamine include ethyl diamine, hexamethylene diamine, xylylene diamine and 1,4-diaminodiphenylmethane. The amount of the above additional component based on the polyhydric alcohol (C) is preferably 10 mol % or less.

In the production process of the present invention, the polyacetal resin (A), the thermoplastic polyurethane (B) and the polyhydric alcohol (C) having at least three hydroxyl groups in the molecule are first mixed with shear at a temperature of 180° to 250° C. and at a temperature at which at least the polyacetal resin (A) and the thermoplastic polyurethane melt (first step).

The above-described three components (A), (B) and (C) are finely dispersed into one another by this mixing with shear. The mixing temperature is set at 180° to 250° C., preferably 180° to 240° C., with a view to completely and finely dispersing these components and substantially suppressing the thermal decomposition of the polymers. By finely dispersing these three components (A), (B) and (C) completely, excellent impact resistance and outer appearance are provided to melt-molded articles from an impact-resistant polyacetal resin composition obtained by the production process of the present invention.

In addition, mixing with shear the components (A), (B) and (C) is carried out at a temperature at which the components (A) and (B) melt. Preferably, the mixing with shear is carried out while the polyhydric alcohol which is the component (C) melts. When the component (C) is solid at room temperature, a temperature at which the component (C) melts is preferably selected as the mixing temperature. The mixing time depends on resin temperature within the apparatus and shear mixing power of the apparatus in individual case and cannot be definitely specified. Normally, however, the time ranges preferably from 5 seconds to 30 minutes, more preferably from 10 seconds to 5 minutes.

Before mixing with shear these three components, any of two components selected from the three components can be preliminarily melt-mixed.

In the production process of the present invention, after or while at least one compound (D) selected from the group consisting of a polyisocyanate ($d_1$) and a compound ($d_2$) which generates a polyisocyanate under heat is added to the mixture of the components (A), (B) and (C) which are finely dispersed into one another, prepared in the first step, namely, in the presence of the compound (D), second mixing with shear is carried out at a temperature of 180° to 250° C. and at a temperature at which at least the components (A) and (B) melt (second step).

The water content of the mixture obtained in the first step is preferably 3,000 ppm or less, more preferably 1,000 ppm or less, when the mixture is supplied to the second step. By adjusting the water content of the mixture to be small, the isocyanate group of the polyisocyanate ($d_1$) to be added to the mixture or the polyisocyanate generated from the compound ($d_2$) can be prevented from inactivation due to the presence of water.

Adjustment of the water content of the mixture obtained in the first step to the above-described range can be made by a method in which the components (A), (B) and (C) to be supplied to the first step are dried to reduce their water contents, or by a method in which the mixture obtained in the first step is dried under atomsphere pressure or a pressure below atmospheric pressure, preferably from 40 mmHg to atmospheric pressure.

When the latter method is employed, drying is preferably carried out at a temperature at which the polyacetal resin (A) and the thermoplastic polyurethane (B) both of which constitute the mixture melt. The above temperature is preferably selected from the temperature range of 180° to 250° C.

The mixing with shear of the second step is carried out at a temperature of 180° to 250° C., preferably 180° to 250° C.

The mixing time depends on resin temperature within the apparatus and shear mixing power of the apparatus in individual case and cannot be definitely specified. Normally, however, the time ranges preferably from 5 seconds to 30 minutes, more preferably from 10 seconds to a 5 minutes.

Therefore, the most important feature of the production process of the present invention is as follows. That is, the first mixing with shear of the first step is carried out for the main purpose of finely dispersing the components (A), (B) and (C) and the mixing with shear of the second step is carried out in the presence of the component (D).

As the result of this, elongation at break at weld portions of injection-molded articles produced from an impact-resistant polyacetal resin composition obtained by the production process of the present invention is improved.

In the production process of the present invention, as for the proportion of the polyacetal resin (A) to the thermoplastic polyurethane (B), the polyacetal resin (A) is preferably used in an amount of 97 to 40 parts by weight, more preferably 95 to 50 parts by weight, and the thermoplastic polyurethane is preferably used in an amount of 3 to 60 parts by weight, more preferably 5 to 50 parts by weight, based on 100 parts by weight of the total amount of these components.

In the above range of the proportion of the polyacetal resin (A) to the thermoplastic polyurethane (B), it is possible to more easily obtain molded articles having sufficient impact resistance, rigidity and tensile strength from an impact-resistant polyacetal resin composition obtained by the production process of the present invention.

The polyhydric alcohol (C) and the compound (D) are each preferably used in an amount of 0.01 to 10 parts by weight, more preferably 0.05 to 7 parts by weight, the most preferably 0.08 to 7 parts by weight, based on 100 parts by weight of the total amount of the polyacetal resin (A) and the thermoplastic polyurethane (B).

In the above range the proportion of the polyhydric alcohol (C) and the compound (D), it is possible to more easily substantially prevent a dispersion phase of the thermoplastic polyurethane from becoming a layer form at weld portions of injection-molded articles from an impact-resistant polyacetal resin composition obtained by the production process of the present invention, whereby the adhesion of the weld portions can be further improved, change with time in the melt viscosity of the composition of the present invention can be held small, and heat resistance can be maintained.

The molar ratio of the isocyanate group of the compound (D) to the hydroxyl group of the polyhydric alcohol (C) (NCO/OH), or the molar ratio of the isocyanate group of the polyisocyanate to be stoichiometrically generated when the compound (D) is the compound ($d_2$) to hydroxyl group of the polyhydric alcohol (C) (NCO/OH), is preferably 0.05/1 to 1/0.05, more preferably 0.1/1 to 1/0.1.

The mixing with shear of the first step and the mixing with shear of the second step can be carried out either batchwise or continuously. For instance, these two steps are preferably carried out continuously using an extruder.

The mixing with shear of the first step and the mixing with shear of the second step can be carried out in a plurality of steps.

The mixing can be carried out, for example, with any one of a monoaxial extruder, twin screw co-rotating extruder, twin screw counter-rotating extruder, co-kneader, disc pack and an internal mixer such as Bumbury mixer, and no special facilities are required. Among them, an intermeshing-type twin screw co-rotating extruder, intermeshing-type twin screw counter-rotating extruder, non-intermeshing- or imperfect intermeshing-type twin screw counter-rotating extruder and co-kneader are especially preferred because they have screws provided at two or more locations for kneading, they have enough ability to mix with shear molten resins, and they can control accurately the temperature in the resin melting zone.

The shearing rate is preferably 1 to $10^4$ sec$^{-1}$, more preferably 5 to $10^4$ sec$^{-1}$. The mixing under above-specified conditions contributes to the formation of a homogeneous polyacetal resin composition to exhibit well balanced physical properties as a molded article.

An example of the process for continuously producing an impact-resistant polyacetal resin composition using an extruder in the mixing with shear of the first step and the mixing with shear of the second step is described hereinunder.

The extruder is provided with a main port from which the polyacetal resin (A), the thermoplastic polyurethane (B) and the polyhydric alcohol (C) are fed. These components are supplied to a first mixing zone by a screw. In this zone, the components (A), (B) and (C) are mixed with shear. This zone is set at a temperature of 180° to 250° C., preferably 180° to 240° C. so that the components (A), (B) and (C) are in a molten state. The holding time in this first mixing zone ranges preferably from approximately 5 seconds to 30 minutes.

A drying zone is provided at an intermediate position between the first mixing zone and a second mixing zone. This drying zone is provided with a vent. The mixture supplied from the first mixing zone by the screw is dried in this drying zone. However, when the components (A), (B) and (C) contain only a slight amount of water, the mixture does not need to be dried in the drying zone.

The drying is carried out with the vent set at atomsphere pressure or a pressure below atmospheric pressure, preferably 40 to atomsphere pressure. Water is discharged from the vent.

In the drying zone, the water content of the mixture prepared in the first mixing zone is adjusted preferably to 3,000 ppm or less, more preferably 1,000 ppm or less.

The holding time in the drying zone ranges preferably from 1 second to 5 minutes.

The mixture is supplied from the drying zone to the second mixing zone by the screw. The second mixing zone is provided with a port for feeding the compound (D). From this port, the compound (D) is supplied using a quantity measuring pump, for example. In the second mixing zone, the mixture from the drying zone and the compound (D) are mixed with shear. The temperature at this zone is selected from a temperature of from 180° to 250° C., preferably 180° to 240° C. and a temperature at which the polyacetal resin (A) and the thermoplastic polyurethane (B) melt.

Since a complex reaction takes place and heat generates in the second mixing zone, temperature control is performed with sufficient care. The holding time in the second mixing zone ranges from approximately 5 seconds to 30 minutes.

The reaction product is extruded from this second mixing zone to a die by the screw. A vent is provided between this zone and the die, if necessary, and a pressure in the vent is set at reduced pressure, preferably 1 to 500 mmHg, so that a volatile component is discharged from this vent.

The concentration of the isocyanate group contained in the impact-resistant polyacetal resin composition produced by the above process is preferably 20 mmol/kg or less, more preferably 5 mmol/kg or less.

By reducing the concentration of the isocyanate group to the above level, change with time in the melt viscosity of the composition can be made small.

One of the methods for reducing the concentration of the isocyanate group to the above level is a method in which the time of mixing with shear in the first and second steps is relatively elongated to 20 seconds to 30 minutes at temperatures of 180 to 250.

In the process of the present invention, a very small amount of a catalyst may be incorporated for promoting a reaction between the isocyanate group and the hydroxyl group. The above catalyst is properly selected from conventionally known urethanation catalysts. Specific examples of the catalyst include tertiary amines such as triethylamine, tributylamine, triethanolamine, N-ethylmorpholine, picoline and diethylaniline; organic tin compounds such as dibutyltin dilaurate, tin octylate and tributyltin acetate; and other compounds such as cobalt naphthenate, lead octylate and titanic acid ester. The amount of the catalyst based on the total amount of the compounds (A), (B), (C) and (D) is preferably 0.0001% to 0.1% by weight.

The above-described catalyst may be added either in the mixing with shear of the first step or in the mixing with shear of the second step, but preferably in the mixing with shear of the second step.

According to the present invention, if necessary, any one of other known additives such as a stabilizer, ultraviolet absorber, releasing agent, lubricant, pigment, glass fiber, carbon fiber, and the like may be added in a suitable amount within the range not detrimental to the physical properties of the resultant impact-resistant polyacetal resin composition.

The reason why the above-described advantages are obtained from the present invention is not clarified, but assumed to be as follows. (1) The polyacetal resin (A) and the thermoplastic polyurethane (B) which is finely dispersed into the matrix of the polyacetal resin (A) are reacted with the compound (D) to produce a type of block polymer in which the high-molecular chain of the polyacetal is bonded with the high-molecular chain of the polyurethane. This block polymer functions to enhance solubility between the polyacetal resin (A) and the thermoplastic polyurethane (B). As the result, adhesion between a polyacetal resin phase and a thermoplastic polyurethane phase is improved. (2) The thermoplastic polyurethane (B) finely dispersed into the matrix of the polyacetal resin (A) is covered with a thermosetting polyurethane which is produced by a reaction between the compound (D) and the polyhydric alcohol (C). As the result, the finely dispersed thermoplastic polyurethane (B) becomes relatively hard.

Because of (1) and (2) above, the above-described advantages of the impact-resistant polyacetal resin composition produced by the process of the present invention, especially improved adhesion of weld portions of injection-molded articles, for example, elongation at break, can be achieved.

Meanwhile, in a polyacetal resin composition produced by the method disclosed by European Laid-open Patent No.0565304A1 in which the components (A), (B), (C) and (D) are mixed with shear in a single step, the thermoplastic polyurethane (B) is covered with a thermosetting polyurethane and is relatively hard as in the present invention, but it is assumed that adhesion of weld portions is inferior to that of the polyacetal resin composition produced by the process of the present invention because the phase of the thermoplastic polyurethane (B) is not finely dispersed fully.

Hereinafter the invention is explained in further details, referring to Examples and Comparative Examples, it being understood that the invention is not limited thereto.

In the following Examples and Comparative Examples, the methods of preparation of test specimens and of evaluation of the respective properties were as follows.
(1) Measurement method for the concentration of residual isocyanate group The pellets of the resulting composition were frozen and pulverized in liquid nitrogen to produce powders. The powders were placed into a desiccator to prevent the powders from absorbing water and then returned to room temperature. The powders were measured for their absorbance at an infrared absorption spectrum (2,270 cm$^{-1}$) by the normal KBr powder method to obtain the concentration (mmol/kg) of the residual isocyanate group from the calibration curve.

The calibration line was drawn by measuring the absorbance of a mixture which had been prepared by mixing the polyacetal powders obtained by pulverization according to the method described above with a predetermined amount of a polyvalent isocyanate compound.

(2) Melt Viscosity

The pellets of the resulting composition were dried at 80° C. for 5 hours and measured for their melt index (g/10 min.) at 190° C. under a load of 2.16 kg according to ASTM D 1238.

(3) Changes in Melt Viscosity

The pellets of the resulting composition were dried at 80° C. for 168 hours and measured for their melt index (g/10 min.) at 190° C. under a load of 2.16 kg according to ASTM D 1238.

(4) Preparation of Test Specimens

Using an injection molding machine (SG125 manufactured by Sumitomo Heavy Industries, Ltd.: clamping force of 125 tons), test specimens were prepared by injection-molding at a cylinder temperature of 190° C., a mold temperature of 40° C. and a molding cycle of 60 sec. to measure Izod impact strength, tensile strength and elongation at break of weld portions.

(5) Izod Impact Strength

Using the test specimens of 3.2 mm in thickness were used to measure for notched Izod impact strength (kg·cm/cm) according to ASTM D 256.

(6) Tensile Strength and Elongation at Break of Weld Portions

Using a mold for tensile specimens for evaluation of weld portions provided with gates at both ends, test specimens having weld portions at the center of parallel sections were molded according to (4) above, and measured for their tensile strength (kg/cm$^2$) and elongation at break (%) of the weld portions according to ASTM D-638.

(7) Measurement of Water Content of Mixture of Source Materials

An appropriate amount of specimen was sampled from the mixture of source materials, placed into the vaporizer of a Karl Fischer water content measuring instrument, and heated to 200° C. to measure the water content of the mixture according to the usually used method.

EXAMPLE 1

Eighty parts by weight of a polyacetal having a melt index of 9 (copolymer type: Iupital F20-01 manufactured by Mitsubishi Gas Chemical Company, Inc.) (8.0 kg), 20 parts by weight of a thermoplastic polyurethane (polyester type: Elastllan S80ASH10 manufactured by Takeda Badische Urethane Industries, Ltd) (2.0 kg), and 0.3 parts by weight of pentaerythritol (0.03 kg) were mixed with a tumbler, and the resulting blend was dried with a circulating hot air dryer at 80° C. for 4 hours. Approximately 2 g of a specimen was sampled from this blend to measure for its water content.

To prepare a composition, an intermeshing type twin screw co-rotating extruder (TEX30 manufactured by Nippon Steel Corp.) schematically shown in FIG. 1 was used. The extruder consists of 12 blocks and the fifth block 2, the seventh block 3 and the tenth block 4 are provided with screws kneading disks, the first block 6 being provided with a port 7 for feeding source materials, the sixth and eleventh blocks being provided with vents (8, 9), respectively, and seventh block being provided with a port 10 for feeding a liquid by a pressure pump In this twin screw extruder, the second block to the fifth block form a first mixing zone, the sixth block a drying zone, and the seventh block to the twelveth block a second mixing zone.

The blend was supplied by a hopper 11 to the port 7 for feeding source materials of the extruder in which the temperature of all the cylinders of the second to twelfth blocks was set at 180° C. at a rate of 10 kg/hr and mixed with shear while being molten. At this time, diphenylmethane-4,4'-diisocyanate (abbreviated as MDI hereinafter) heated to 45° C. were added from the port 10 to the seventh block by the pressure pump at a rate of 0.10 kg/hr to give a resin strand having a resin temperature of 215° C. from a die (not shown). In this instance, the vent 8 of the sixth block was closed and a pressure in the vent 9 of the eleventh block was reduced to 60 mmHg. According to the usually used method, the strand was pelletized. Using the obtained pellets, Izod impact specimens and welded tensile specimens were prepared by the above-described injection molding.

Subsequently, evaluation tests were conducted. Results are shown in Table 1.

EXAMPLE 2

The procedure of Example 1 was repeated except that the blend of the polyacetal, thermoplastic polyurethane and pentaerythritol was not dried and supplied to the extruder and that the vent 8 of the sixth block was reduced to 60 mmHg. Results are shown in Table 1.

COMPARATIVE EXAMPLE 1

The procedure of Example 2 was repeated except that pentaerythritol was not added. Results are shown in Table 1.

COMPARATIVE EXAMPLE 2

The procedure of Example 2 was repeated except that MDI was added from the main port of the first block. Results are shown in Table 1.

COMPARATIVE EXAMPLE 3

The procedure of Example 2 was repeated except that MDI was not added. Results are shown in Table 1.

EXAMPLE 3

The procedure of Example 2 was repeated except that a polyacetal with a melt index of 27 (copolymer type: Iupital F30-01 manufactured by Mitsubishi Gas Chemical Company, Inc.) was used. Results are shown in Table 2.

EXAMPLE 4

The procedure of Example 2 was repeated except that the amount of the polyacetal to be added was changed to 70 parts by weight (7.0 kg) and that of the thermoplastic polyurethane to 30 parts by weight (3.0 kg). Results are shown in Table 2.

EXAMPLE 5

The procedure of Example 2 was repeated except that the temperatures of the second to sixth blocks of the extruder were set at 240° C. and the resin temperature of the sixth block was set at 245° C. Results are shown in Table 2.

COMPARATIVE EXAMPLE 4

The procedure of Example 2 was repeated except that the temperatures of the eighth to twelfth blocks of the extruder were set at 170° C. and the resin temperature at an outlet of the die was set at 177° C. Results are shown in Table 2.

COMPARATIVE EXAMPLE 5

The procedure of Example 2 was repeated except that pentaerythritol and MDI were not added. Results are shown in Table 2.

TABLE 1

|  |  | Ex. 1 | Ex. 2 | CEx. 1 | CEx. 2 | CEx. 3 |
|---|---|---|---|---|---|---|
| Source material Feed rate (kg/hr) | | | | | | |
| (A) | Polyacetal resin A | 8.00 | 8.00 | 8.00 | 8.00 | 8.00 |
|  | Polyacetal resin B | | | | | |
| (B) | Thermoplastic polyurethane | 2.00 | 2.00 | 2.00 | 2.00 | 2.00 |
| (C) | Pentaerythritol | 0.03 | 0.03 | 0 | 0.03 | 0.03 |
| (D) | MDI | 0.10 | 0.10 | 0.10 | 0.10 | 0 |
| Dry mixture of (A), (B) and (C) | | | | | | |
| Drying temperature | | 80° C. | — | — | — | — |
| Water content (ppm) | | 310 | 4,400 | 4,400 | 4,400 | 4,400 |
| (D) | Site of MDI addition (block number) | 7 | 7 | 7 | 1 | — |
| Degassing through vent of sixth block | | No | Yes | Yes | Yes | Yes |
| Resin temperature (°C.) | | | | | | |
| Sixth block | | 185 | 185 | 185 | 185 | 185 |
| Die | | 215 | 215 | 220 | 215 | 210 |
| Physical properties of composition | | | | | | |
| Concentration of residual isocyanate group (mmol/kg) | | Not detected | Not detected | 11 | 6 | Not detected |
| Melt Index | | | | | | |
| after 5 hours | | 1.8 | 1.8 | 0.1 | 0.3 | 6.2 |
| after 168 hours | | 1.8 | 1.8 | 0.06 | 0.1 | 6.2 |

TABLE 1-continued

|  | Ex. 1 | Ex. 2 | CEx. 1 | CEx. 2 | CEx. 3 |
|---|---|---|---|---|---|
| Izod impact strength (kg cm/cm) | 26 | 25 | 18 | 22 | 17 |
| Tensile strength of weld portion (kg/cm$^2$) | 374 | 374 | 373 | 375 | 345 |
| Elongation at break of weld portion (%) | 167 | 168 | 40 | 40 | 6 |

Note:
Polyacetal A: Iupital F20-01 manufactured by Mitsubishi Gas Chemical Company, Inc. (Melt index: 9.0)
Polyacetal B: Iupital F30-01 manufactured by Mitsubishi Gas Chemical Company, Inc. (Melt index: 27)
Thermoplastic polyurethane: Elastllan S80ASH10 manufactured by Takeda Badische Urethane Industries, Ltd.

TABLE 2

|  |  | Ex. 3 | Ex. 4 | Ex. 5 | CEx. 4 | CEx. 5 |
|---|---|---|---|---|---|---|
| Source material Feed rate (kg/hr) | | | | | | |
| (A) | Polyacetal resin A | | 7.00 | 8.00 | 8.00 | 8.00 |
|  | Polyacetal resin B | 8.00 | | | | |
| (B) | Thermoplastic polyurethane | 2.00 | 3.00 | 2.00 | 2.00 | 2.00 |
| (C) | Pentaerythritol | 0.03 | 0.03 | 0.03 | 0.03 | 0 |
| (D) | MDI | 0.10 | 0.10 | 0.10 | 0.10 | 0 |
| Dry mixture of (A), (B) and (C) | | | | | | |
| Drying temperature | | — | — | — | — | — |
| Water content (ppm) | | 4,400 | 4,400 | 4,400 | 4,400 | 4,400 |
| (D) | Site of MDI addition (block number) | 7 | 7 | 7 | 7 | — |
| Degassing through vent of sixth block | | Yes | Yes | Yes | Yes | Yes |
| Resin temperature (°C.) | | | | | | |
| Sixth block | | 185 | 190 | 245 | 185 | 185 |
| Die | | 215 | 220 | 225 | 177 | 215 |
| Physical properties of composition | | | | | | |
| Concentration of residual isocyanate group (mmol/kg) | | Not detected | Not detected | Not detected | 25 | Not detected |
| Melt Index | | | | | | |
| after 5 hours | | 3.2 | 0.8 | 1.8 | 3.2 | 6.1 |
| after 168 hours | | 3.2 | 0.8 | 1.8 | 0.8 | 6.1 |
| Izod impact strength (kg · cm/cm) | | 20 | 75 | 20 | 14 | 14 |
| Tensile strength of weld portion (kg/cm$^2$) | | 370 | 382 | 373 | 348 | 345 |
| Elongation at break of weld portion (%) | | 155 | 150 | 155 | 8 | 6 |

What is claimed is:

1. A process for producing an impact-resistant polyacetal resin composition, which comprises:

a first step of mixing with shear a polyacetal resin (A), a thermoplastic polyurethane (B) and a polyhydric alcohol (C) having at least three hydroxyl groups in the molecule at a temperature of 180° to 250° C. and at a temperature at which said polyacetal resin (A) and said thermoplastic polyurethane (B) melt; and a second step of mixing with shear the resulting mixture obtained in the first step, in the presence of at least one compound (D) selected from the group consisting of a polyisocyanate ($d_1$) and a compound ($d_2$) which generates a polyisocyanate under heat, at a temperature of 180° to 250° C. and at a temperature at which said polyacetal resin (A) and said thermoplastic polyurethane (B) melt, wherein (1) the first step and the second step are carried out continuously using one extruder;

(2) said extruder has first and second mixing zones and a drying zone which is provided with a vent and disposed between said mixing zones;

(3) the first step is carried out in the first mixing zone and the second step is carried out in the second mixing zone which is closer to a die than the first mixing zone and supplied with said compound (D), and the mixture obtained in the first step is dried in the drying zone by maintaining the vent at atmospheric pressure or a pressure below atmospheric pressure to discharge water of the mixture from the vent; and (4) the water content of the mixture to be supplied to the second step is 3,000 ppm or less.

2. A process for producing an impact-resistant polyacetal resin composition, which comprises:

a first step of mixing with shear a polyacetal resin (A), a thermoplastic polyurethane (B) and a polyhydric alcohol (C) having at least three hydroxyl groups in the molecule at a temperature of 180° to 250° C. and at a temperature at which said polyacetal resin (A) and said thermoplastic polyurethane (B) melt; and a second step of mixing with shear the resulting mixture obtained in the first step, in the presence of at least one compound (D) selected from the group consisting of a polyisocyanate ($d_1$) and a compound ($d_2$) which generates a polyisocyanate under heat, at a temperature of 180° to 250° C. and at a temperature at which said polyacetal resin (A) and said thermoplastic polyurethane (B) melt, wherein (1) the first step and second step are carried out continuously using one extruder;

(2) said extruder has first and second mixing zones;

(3) the first step is carried out in the first mixing zone and the second step is carried out in the second mixing zone which is closer to a die of said extruder than the first mixing zone and supplied with said compound (D);

(4) the polyacetal resin (A), the thermoplastic polyurethane (B) and the polyhydric alcohol (C) are predried to reduce their water content and then supplied to the first step; and (5) the water content of the mixture to be supplied to the second step is 3,000 ppm or less.

3. The process according to claim 2, wherein 97 to 40 parts by weight of said polyacetal resin (A), 3 to 60 parts by weight of said thermoplastic polyurethane (B), 0.01 to 10 parts by weight of said polyhydric alcohol (C) and 0.01 to 10 parts by weight of said compound (D) are used in the first and second steps based on 100 parts by weight of the total amount of said polyacetal resin (A) and said thermoplastic polyurethane (B).

4. The process according to claim 2, wherein the concentration of an isocyanate group contained in the impact-resistant polyacetal resin composition is 20 mmol/kg or less.

5. The process according to claim 1, wherein the resulting mixture obtained in the first step is dried at a temperature at which said polyacetal resin (A) and said thermoplastic polyurethane (B), both of which constitute the mixture, melt.

6. The process according to claim 5, wherein the resulting mixture obtained in the first step is dried at a temperature of 180° to 250° C.

7. The process according to claim 1, wherein 97 to 40 parts by weight of said polyacetal resin (A), 3 to 60 parts by weight of said thermoplastic polyurethane (B), 0.01 to 10 parts by weight of said polyhydric alcohol (C) and 0.01 to 10 parts by weight of said compound (D) are used in the first and second steps based on 100 parts by weight of the total amount of said polyacetal resin (A) and said thermoplastic polyurethane (B).

8. The process according to claim 1, wherein the concentration of an isocyanate group contained in the impact-resistant polyacetal resin composition is 20 mmol/kg or less.

* * * * *